United States Patent [19]
Hara

[11] Patent Number: 5,436,842
[45] Date of Patent: Jul. 25, 1995

[54] METHOD OF AND APPARATUS FOR INDICATING NUMBER OF BLANKS TO BE INTRODUCED FOR PRODUCTS, AND MANUFACTURING SYSTEM USING THE SAME

[75] Inventor: Ryuichi Hara, Itami, Japan

[73] Assignee: Mitsubishi Denki Kabushiki Kaisha, Tokyo, Japan

[21] Appl. No.: 182,693

[22] Filed: Jan. 13, 1994

[30] Foreign Application Priority Data

Jan. 18, 1993 [JP] Japan ..................... 5-005875

[51] Int. Cl.⁶ ................................. G06F 15/00
[52] U.S. Cl. ..................... 364/468; 364/469; 364/478
[58] Field of Search ............. 364/468, 478, 403, 469

[56] References Cited

U.S. PATENT DOCUMENTS

| | | | |
|---|---|---|---|
| 4,819,176 | 4/1989 | Ahmed et al. ............ | 364/468 |
| 4,866,628 | 9/1989 | Natarajan ................. | 364/468 |
| 4,887,206 | 12/1989 | Natarajan ................. | 364/401 |
| 4,887,207 | 12/1989 | Natarajan ................. | 364/401 |
| 4,931,944 | 6/1990 | Richter et al. ............ | 364/468 |
| 5,047,947 | 9/1991 | Stump ...................... | 364/468 |
| 5,148,370 | 9/1992 | Litt et al. ................. | 364/468 |
| 5,164,905 | 11/1992 | Iwasaki et al. ........... | 364/468 |
| 5,299,115 | 3/1994 | Fields et al. .............. | 364/401 |
| 5,327,340 | 7/1994 | Kaneko et al. ............ | 364/401 |

*Primary Examiner*—Paul P. Gordon
*Attorney, Agent, or Firm*—Leydig, Voit & Mayer

[57] ABSTRACT

The present invention relates to a method of and apparatus for indicating the number of blanks to be introduced for products which are classified into ranks according to their properties. The invention also relates to a manufacturing system for manufacturing products using the method. The method comprises the steps of computing the number of blanks to be introduced based on the number of products ordered and the output ratio according to product rank, which quantity is sufficient to satisfy the amount of the orders made for all of the product ranks; computing the output of each of the product ranks when the blanks have been introduced in an amount equal to the first number of blanks; comparing the computed output of each of the product ranks to their respective maximum production values; outputting the first number of blanks to be introduced as the final number to be introduced when it has been judged that none of the outputs of the product ranks exceeds their respective maximum production values; and computing the second number of blanks to be introduced as the final number to be introduced when it has been judged that none of the outputs of the product ranks exceeds their respective maximum production values, and outputting this second number as the final number to be introduced, so that none of the outputs of the product ranks exceeds their respective maximum production values.

9 Claims, 7 Drawing Sheets

METHOD OF AND APPARATUS FOR INDICATING NUMBER OF BLANKS TO BE INTRODUCED FOR PRODUCTS, AND MANUFACTURING SYSTEM USING THE SAME

BACKGROUND OF THE INVENTION

1. Field of the Invention

The present invention relates to a method and apparatus for indicating the number of blanks to be introduced into a manufacturing apparatus to be formed into products classified into ranks according to their properties, so that the number of blanks does not exceed a maximum production value previously set for each of the product ranks. The invention also relates to a manufacturing system for manufacturing products using the method.

2. Description of the Related Art

In general, even when a plurality of blanks is simultaneously processed under the same conditions in the same lot using a manufacturing apparatus, products having different properties are manufactured at a ratio characteristic of the manufacturing apparatus. For example, if 100 blanks, introduced into the manufacturing apparatus and processed under the same conditions, are classified into four ranks, Ranks 1 through 4, according to their properties, and if it is assumed that ten Rank-1 products, thirty Rank-2 products, twenty Rank-3 products, and forty Rank-4 products are manufactured, the ratio at which each of the products according to Ranks 1 through 4 is manufactured (hereinafter referred to as output ratio) is 10%, 30%, 20%, and 40%, respectively.

In consideration of the output ratio conventionally based on the ranks of the products, the number of blanks to be processed by a manufacturing apparatus has been computed using a method such as that shown in FIG. 7. Here, the numbers of products ordered for Ranks 1 through 4 are assumed to be a, b, c, and d respectively, and the output ratio for Ranks 1 through 4 are assumed to be A %, B %, C %, and D % respectively. First, in Step S1 of the method, the number of blanks necessary to manufacture each of the products for Ranks 1 through 4, N1 through N4, is determined. The number of blanks to be introduced is obtained by dividing the number of products ordered according to the product ranks by their respective output ratios. That is, for Rank-1 products, this number is obtained by calculating N1=100 a/A. Next, in Step S2, the largest value, N, among N1 through N4 computed according to the ranks is obtained. In Step S3, the largest value, N, is output as the number of blanks to be introduced to satisfy the amount of orders made for all of the product ranks.

In this way, hitherto, the number of blanks for accomplishing the production plan has been calculated according to rank, the largest value among the computed quantities being the final number of blanks to be introduced. As a result, there has been a problem in that an excess of some of the product ranks was produced. When the number of products produced exceeds, for example, a value which is the sum of the number of products ordered and the number of products which can be stocked, it is necessary to dispose of the excess products.

SUMMARY OF THE INVENTION

The present invention intends to solve such a problem by providing a method and apparatus for indicating the number of blanks to be introduced for products, so that the number of blanks introduced does not exceed the previously set maximum production value for each of the product ranks.

The present invention also provides a manufacturing system which does not wastefully produce in excess of the scheduled amount.

To these ends, according to one aspect of the present invention, there is provided a method of indicating the number of blanks to be introduced for products comprising the steps of computing the first number of the blanks to be introduced based on the number of products ordered and output ratio according to each of the product ranks, which quantity is sufficient to satisfy the amount of the orders made for all of the ranks; computing the output of each of the product ranks when the blanks are introduced in an amount equal to the first number to be introduced; comparing the computed output of each product rank to its corresponding maximum production value; outputting the first number of blanks to be introduced as the final number of blanks to be introduced when it has been judged that none of the product rank outputs exceed their respective maximum production values; and computing the second number of blanks to be introduced so that none of the product rank outputs exceeds their respective maximum production values when it has been judged that the output of any one of the product ranks exceeds its respective maximum production value and outputting this second number as the final number of blanks to be introduced.

According to another aspect of the present invention, there is also provided an apparatus for indicating the number of blanks to be introduced comprising a number ordered input section for inputting the number of products ordered in accordance with the product ranks; a maximum production value input section for inputting the maximum production value in accordance with the product ranks; an output ratio input section for inputting the output ratio in accordance with the product ranks; first blank introducing number computing means for computing the first number of blanks to be introduced based on the number of products ordered, which has been input from the aforementioned number ordered input section, and the output ratios input from the above-described output ratio input section, which quantity is sufficient to satisfy the amount of orders made for each of the product ranks; output computing means for computing the output of each of the product ranks when a number of blanks equal in amount to the first number of blanks to be introduced has been introduced; comparing means for comparing the output of each of the product ranks to its respective maximum production value, input from the aforementioned maximum production value input section; second blank introducing number computing means for computing the second number of blanks to be introduced so that none of the product rank outputs exceeds their respective maximum production values when the aforementioned comparing means has judged that the output of any one of the product ranks exceeds its maximum production value; introducing number output means for outputting the final number of blanks to be introduced; and control means which sends to the introducing number output section the first number of blanks to be introduced as the final number of blanks to be introduced when the comparing means has judged that none of the product rank outputs exceeds their respective maximum production values, and which sends to the introducing number output section the second number of blanks to be introduced as the final number of blanks to be introduced when the comparing means has judged that the output of any one of the product ranks exceeds its maximum production value.

According to a still further aspect of the present invention, there is provided a manufacturing system comprising a number ordered input section for inputting the number of products ordered in accordance with the product ranks; a maximum production value input section for inputting the maximum production value in accordance with the product ranks; an output ratio input section for inputting the output rate in accordance with the product ranks; first blank introducing number computing means for computing the first number of blanks to be introduced based on the number of products ordered, which has been input from the number ordered input section, and the output ratios input from the output ratio input section, which quantity is sufficient to satisfy the amount of the orders made for each of the product ranks; output computing means for computing the output of each of the product ranks when a number of blanks equal in number to the first number of blanks to be introduced has been introduced; comparing means for comparing each of the product rank outputs with its respective maximum production value which are input from the maximum production value input section; second blank introducing number computing means for computing the second number of blanks to be introduced so that none of the product rank outputs exceeds their respective maximum production values when the comparing means has judged that the output of any one of the product ranks exceeds its maximum production value; a manufacturing apparatus which processes the indicated number of blanks and manufactures the products; and control means which indicates to the aforementioned manufacturing apparatus that the first number of blanks to be introduced is the final number of blanks to be introduced when the aforementioned comparing means has judged that none of the product rank outputs exceeds their respective maximum production values, and which indicates to the manufacturing apparatus that the second number of blanks to be introduced is the final number of blanks to be introduced when the comparing means has judged that the output of any one of the product ranks exceeds its respective maximum production value.

DESCRIPTION OF THE PREFERRED EMBODIMENTS

Embodiments of the present invention will be hereunder described with reference to the attached drawings.

Embodiment 1

Figure 1:
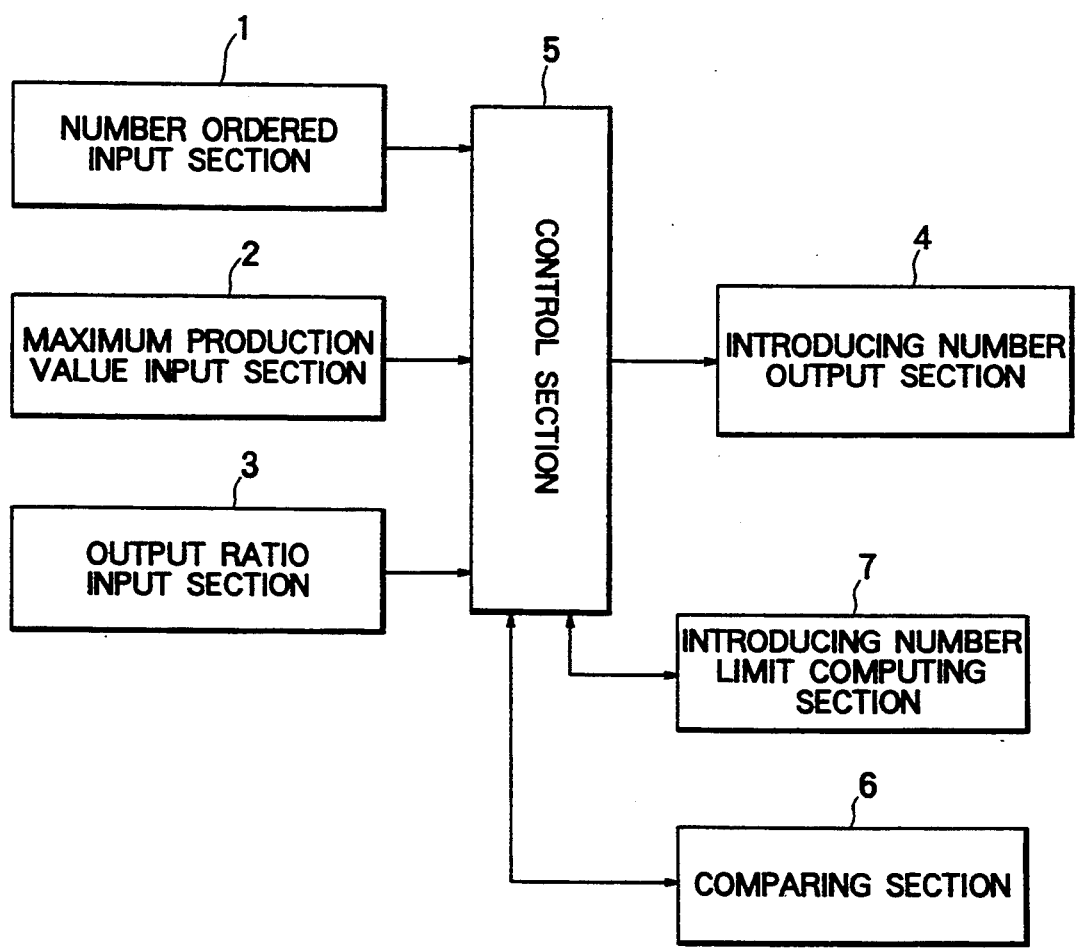
FIG. 1 is a block diagram illustrating a first embodiment of an apparatus for indicating the number of blanks to be introduced.

Referring to FIG. 1, connected to a control section 5 are a number ordered input section 1 for inputting the number of products ordered in accordance with the product ranks, a maximum production value input section 2 for inputting the maximum production value for each of the product ranks, and an output ratio input section for inputting the output ratio for each of the product ranks. The maximum production value, usually is a value, for example, which is the sum of the ordered amount of a product rank and the quantity of the product which can be kept in stock. This largest value serves as an index for indicating that a production amount exceeding this value will result in making it impossible to stock the product. The output ratio is characteristic of a manufacturing apparatus to which blanks are to be introduced.

Connected to the control section 5 are a comparing section 6, an introducing number limit computing section 7, and an introducing number output section 4. The comparing section 6 judges whether or not the product rank outputs exceed their respective maximum production values which have been input from the maximum production value input section 2 when blanks are introduced in an amount sufficient to satisfy the amount of the orders made for each of the product ranks. The introducing number limit computing section 7 computes a limit for the number of blanks to be introduced so that none of the amounts of the product ranks produced exceeds their respective maximum product values. The introducing number output section 4 outputs the final number of blanks to be introduced.

Figure 2:
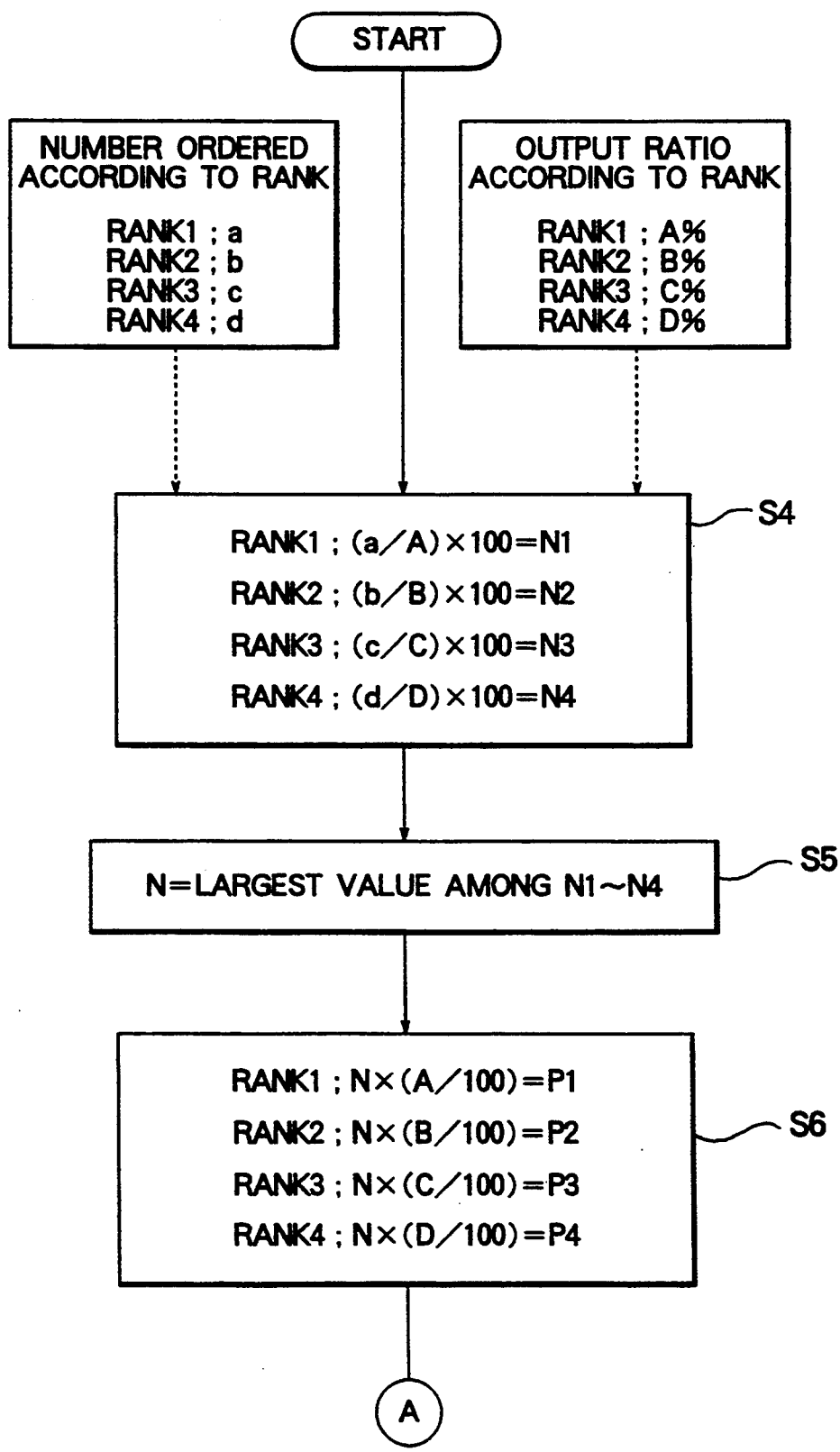
FIGS. 2 and 3 are flow charts showing the operations of the first embodiment.
Figure 3:
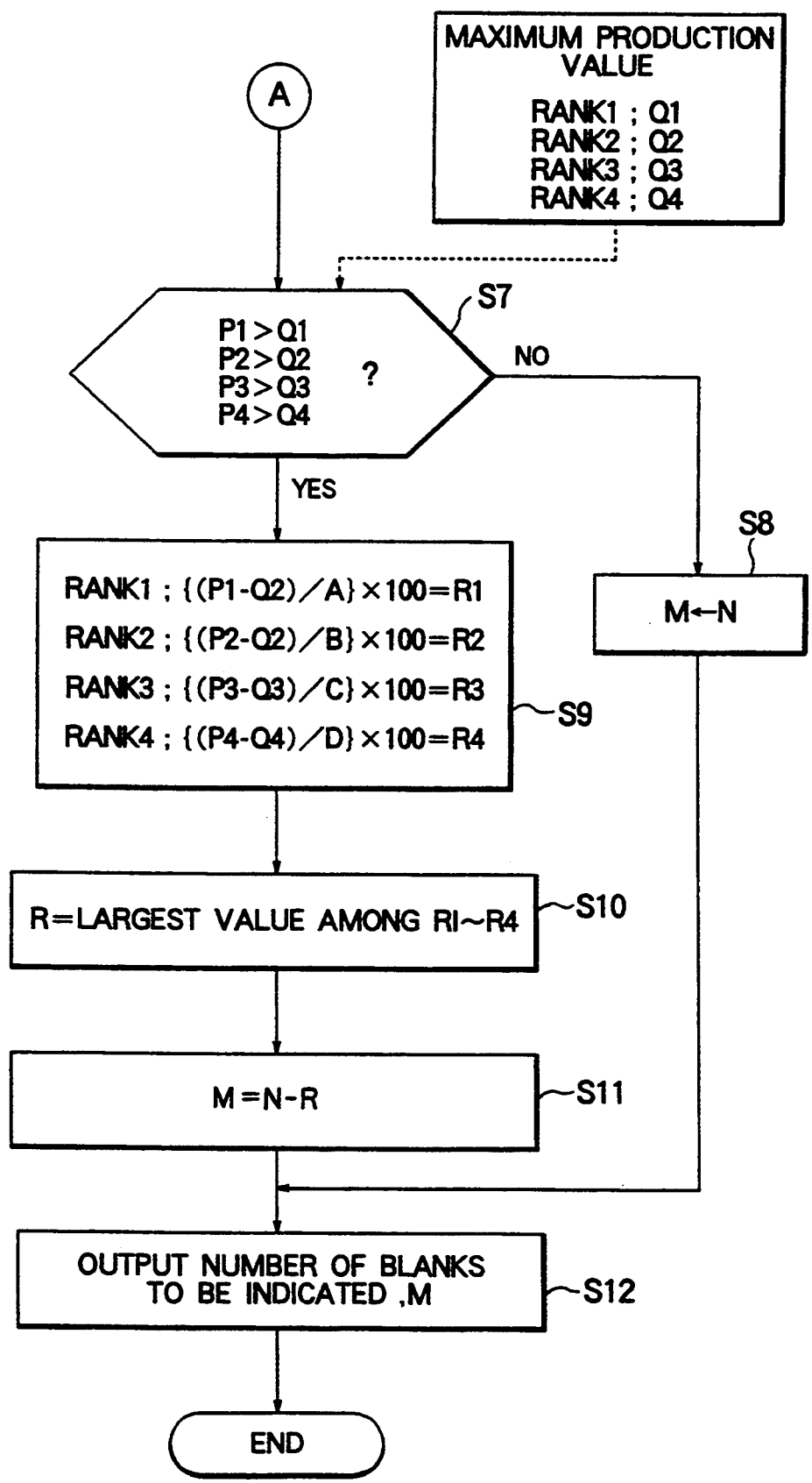

The operations of the first embodiment will be described with reference to the flow charts of FIGS. 2 and 3. Here, the products are classified into four ranks, Ranks 1 through 4, and it is assumed that (1) the number of products ordered for each of the product ranks 1 through 4 has been input as a products, b products, c products, and d products, respectively, from the number ordered input section 1, and (2) the output ratio of each of the product ranks 1 through 4 has been input as A%, B%, C%, and D% respectively. It is also assumed that the maximum production value of each of the product Ranks 1 through 4 has been input as Q1, Q2, Q3, and Q4, respectively, from the maximum production value input section 2.

First, in Step S4 the required number of blanks to be introduced, N1 through N4, is computed for each of the product Ranks 1 through 4 that have been ordered. The number of blanks to be introduced is computed by dividing the number of products ordered of a particular rank by its output ratio. For example, the number of blanks introduced for a Rank-1 product is computed as $N1 = 100a/A$. Next, in Step S5 the largest value N among the number of blanks introduced, N1 through N4, which have been computed according to rank is determined as the quantity sufficient to satisfy the amount of the orders made for all of the product ranks. In Step S6, each of the outputs, P1 through P4, is computed for each of the product ranks when N blanks are introduced. For example, the output of the Rank-1 product is determined using output ratio A% and evaluating $P1 = N \times A/100$. Steps S4 though S6 are carried out using the control section 5.

Transmitted from the control section 5 to the comparing section 6 are the respective maximum production values Q1 through Q4 of each of the Ranks 1 through 4 and each of the outputs P1 through P4 computed in Step S6. In Step S7, the comparing section 6 compares each of the outputs P1 through P4 with the maximum production values Q1 through Q4 of each of the ranks. When it has been judged that none of the outputs P1 through P4 of each of the ranks exceeds its respective maximum value Q1 through Q4, the next step, S8 is carried out. Here, the control section 5 sets the final number of blanks to be introduced M equal to the largest number N.

On the other hand, if in Step S7 the output of any one of the ranks P1 through P4 is judged as exceeding its respective maximum production value Q1 through Q4, Step S9 is carried out. Here, the introducing number limit computing section 9 computes a limit for the number of blanks to be introduced R1 through R4 for each of the ranks. These values R1 through R4 represent how much the introducing number is reduced so that the output of each of the ranks P1 through P4 does not exceed its respective maximum production values Q1 through Q4. For example, the value for a Rank-1 is determined by evaluating $R1 = 100(P1 - Q1)/A$. In Step S10, the introducing number limit computing section 7 determines the largest value R among the introducing number limit values R1 through R4 for each of the ranks. The largest value is established as the introducing number limit value, so that none of the outputs for each of the product ranks exceeds its respective maximum production value. In Step S11, the control section 5 determines the final number of blanks to be introduced M by subtracting the largest value R computed in Step S10 from the largest value N computed in Step S5.

In Step S12, the number of blanks to be indicated M determined in Step S8 or Step S11 is transmitted from the control section 5 to the introducing number output section 4. This number is displayed on-line or as a list on the output section 4.

Embodiment 2

Figure 4:
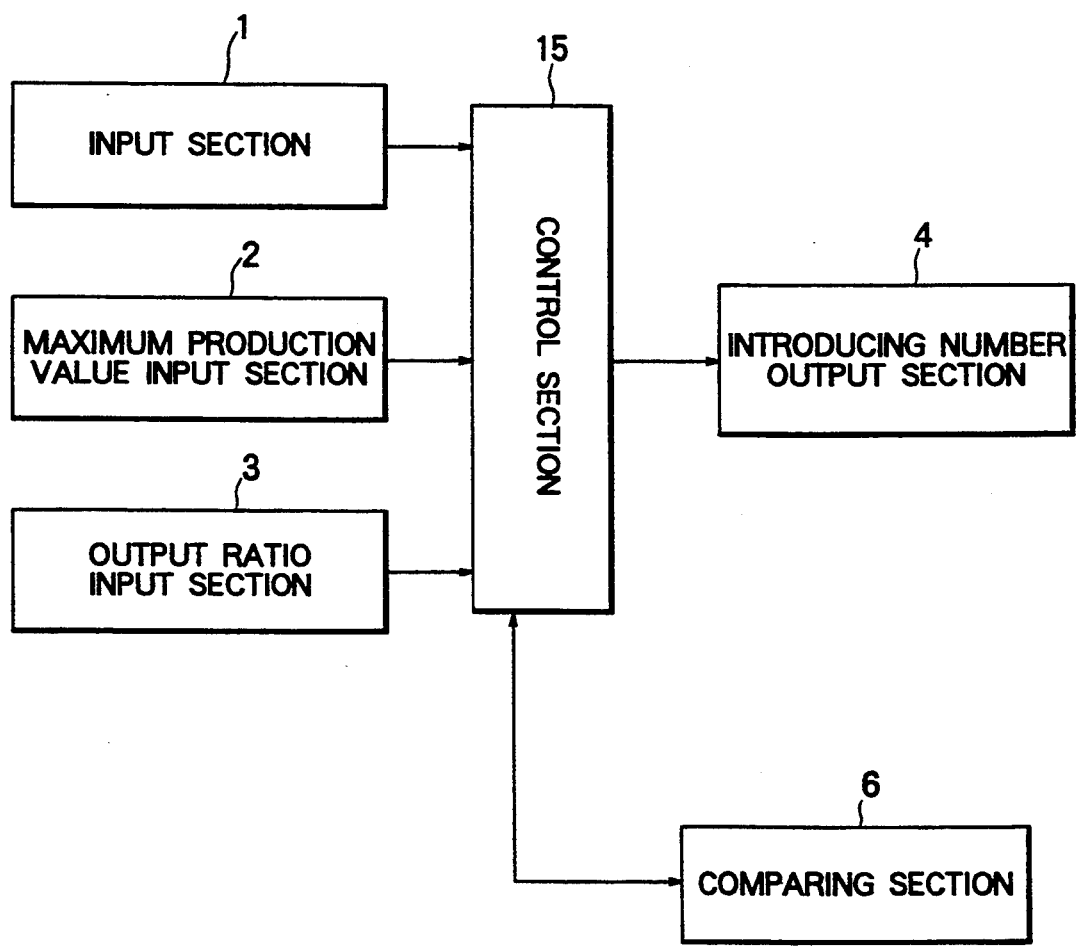
FIG. 4 is a block diagram illustrating a second embodiment of an apparatus for indicating the number of blanks to be introduced.

FIG. 4 is a block diagram illustrating an introducing number indicating apparatus according to a second embodiment of the present invention. The indicating apparatus of this embodiment comprises the same component parts as the apparatus in the first embodiment, except that the introducing number limit computing section 7 has been omitted and that the control section 5 has been replaced by a control section 15.

Figure 5:
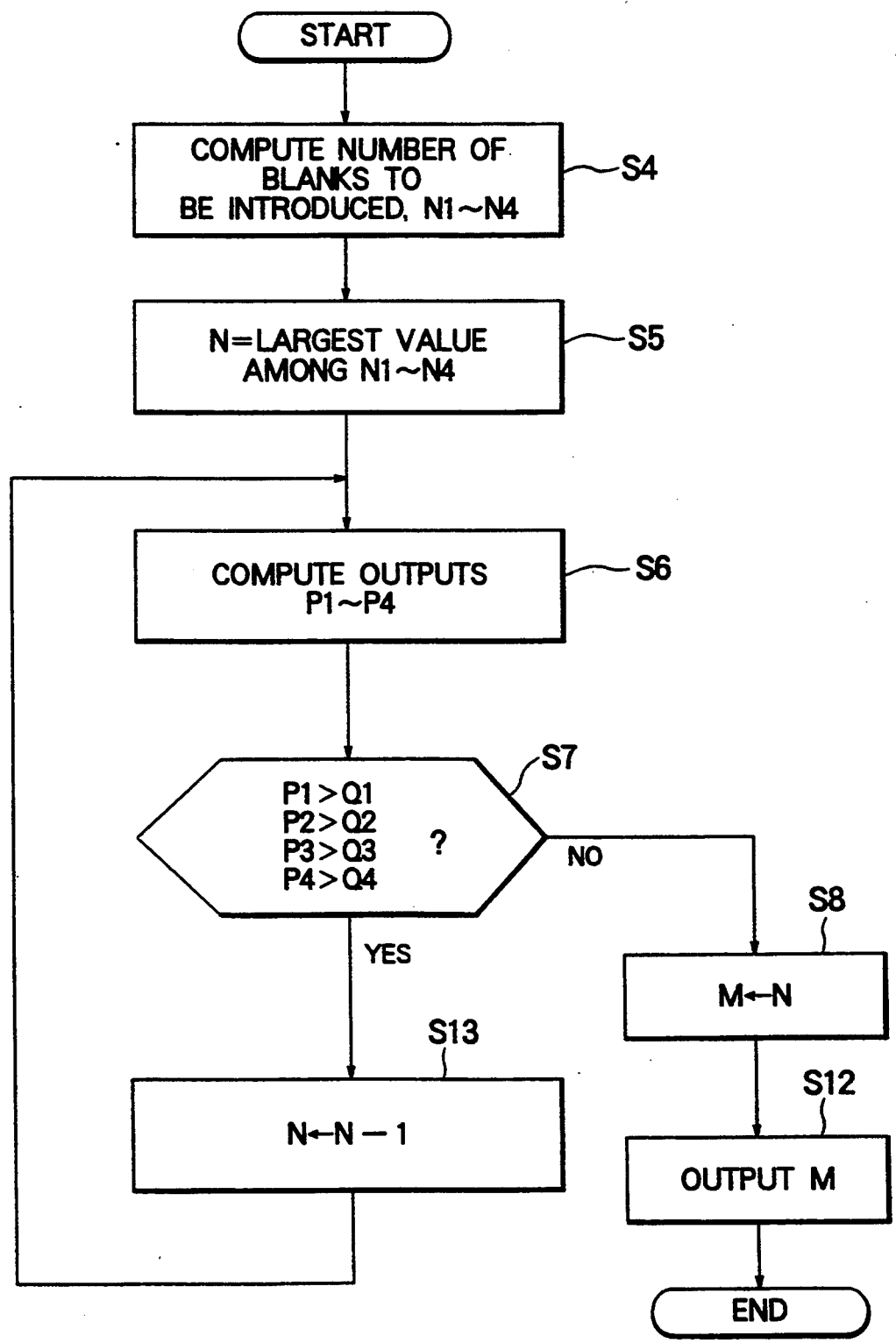
FIG. 5 is a flow chart showing the operations of the second embodiment.

The operations of the second embodiment will be described with reference to the flow chart in FIG. 5. In this figure, Steps S4 through S8 and S12 are identical to those in the flow chart of the first embodiment illustrated respectively in FIGS. 2 and 3. That is, when, in Step S7, none of the outputs P1 through P4 of each of the product ranks has been judged to exceed its respective maximum value Q1 through Q4, the same operations as those in the first embodiment are carried out, and the largest value N computed in Step S5 is output from the introducing number output section 4 as the final number of blanks to be indicated M.

On the other hand, if, in Step S7, the output of any one of the ranks P1 through P4 is judged as exceeding its respective maximum production value Q1 through Q4, Step S13 is carried out. In this step, the control section 15 subtracts one from the largest value N computed in Step S5 and establishes this value as the new introducing number to be indicated N. The apparatus, then returns to Step S6 and uses this number to be indicated N for computing the outputs P1 through P4 for each of the ranks. Afterwards, in Step S7, the comparing section 6 once again compares the outputs P1 through P4 to their respective maximum values Q1 through Q4. In this way, Steps S13, S6 and S7 are repeated until, in Step S7, it is judged that none of the outputs P1 through P4 of each of the Ranks 1 through 4 exceeds its respective maximum value Q1 through Q4. In other words, one is subtracted each time from the number of blanks to be indicated N.

After it has been judged, in Step S7, that none of the outputs P1 through P4 of each of the Ranks 1 through 4 exceed its respective maximum value Q1 through Q4, Steps S8 and S12 are carried out, outputting the final number of blanks to be indicated M.

Embodiment 3

Figure 6:
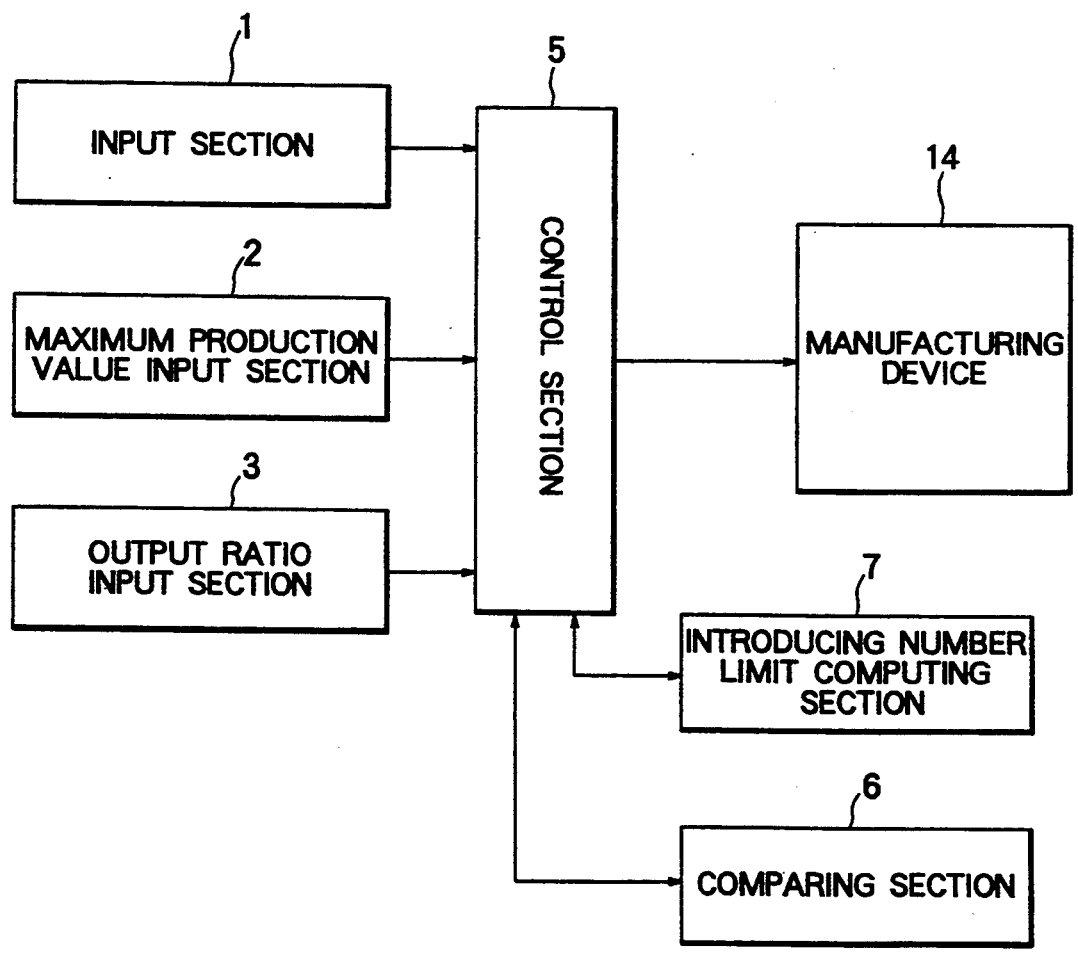
FIG. 6 is a block diagram illustrating a manufacturing system according to a third embodiment.
Figure 7:
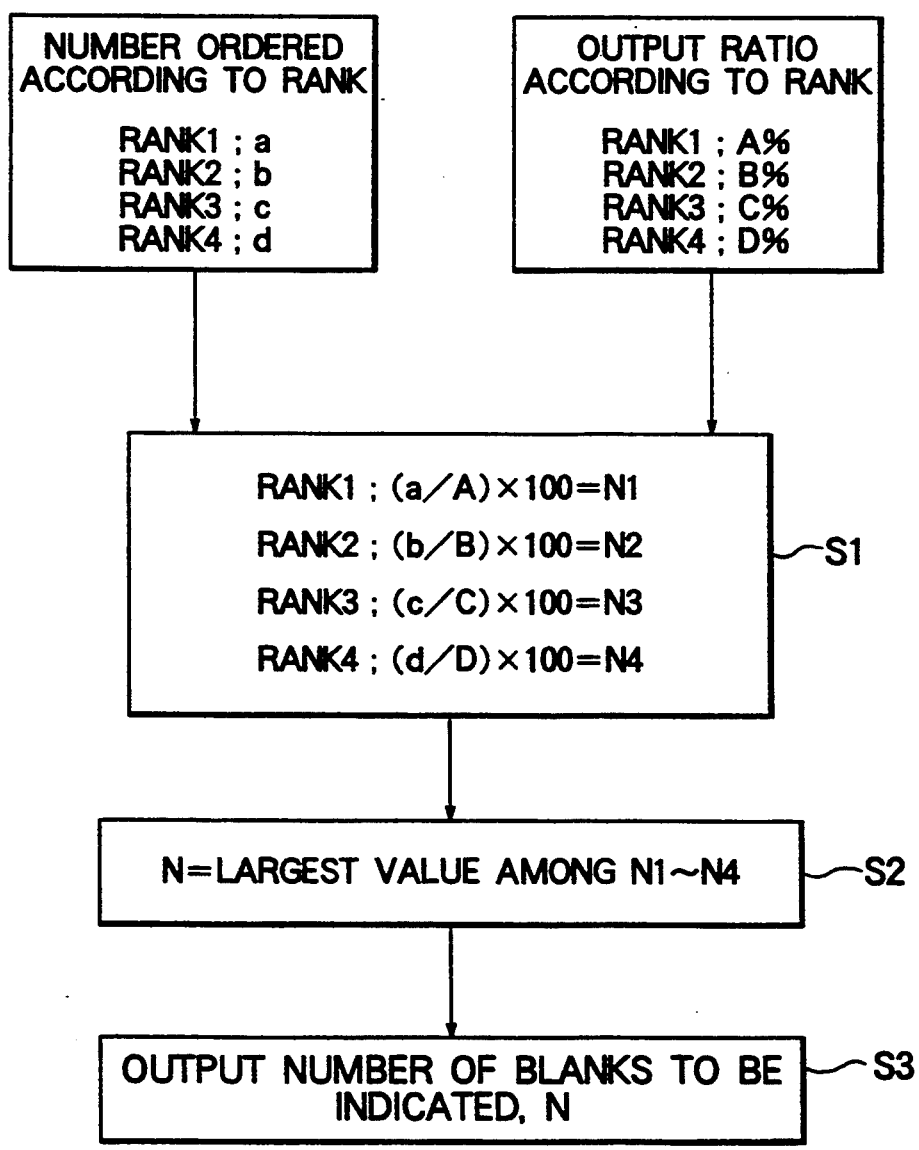
FIG. 7 is a flow chart showing a conventional method of indicating the number of blanks to be introduced.

FIG. 6 illustrates an embodiment of a manufacturing system according to the present invention. The manufacturing system comprises the same component parts as the introducing number indicating apparatus of the first embodiment, except that the introducing number output section 4 is replaced by a manufacturing device 14. The final number of blanks to be indicated M, which has been determined in Step S8 or S11 in the flow chart of the first embodiment represented in FIG. 3, is directly input into the manufacturing device 14. Then, the blanks in an amount equal to the indicated number of blanks to be introduced M are automatically introduced into the manufacturing device 14. In this way, in the manufacturing system of the third embodiment an appropriate amount of blanks is automatically introduced and manufactured into products.

In addition, in the second embodiment the introducing number output section 4 may be replaced by a manufacturing device 14.

What is claimed is:

1. A method of indicating the number of blanks to be introduced for products, comprising the steps of:
   computing a first number of blanks to be introduced based on the number of products ordered and output ratio according to product rank, which quantity is sufficient to satisfy the amount of the orders made for each of the product ranks;
   computing the output of each of the product ranks when a number of blanks equal in number to the first number of blanks to be introduced has been introduced;
   comparing the computed output of each of the product ranks to its respective maximum production;
   outputting the first number of blanks to be introduced as a final number of blanks to be introduced when it has been judged that none of the outputs of the product ranks exceeds their respective maximum production value; and
   computing a second number of blanks to be introduced as the final number of blanks to be introduced when it has been judged that the output of any one of the product ranks exceeds its respective maximum production value, so that none of the outputs of the product ranks exceeds their respective maximum production values, and outputting this second number of blanks to be introduced as the final number of blanks to be introduced.

2. A method according to claim 1, in which when it has been judged that the output of any one of the product ranks exceeds its respective maximum production value, the following steps are carried out:

computing a limit regarding the number of blanks to be introduced is controlled so that the output of any of the product ranks does not exceed its respective maximum production value; and computing the second number of blanks to be introduced by subtracting this limit value from the first number of blanks to be introduced.

3. A method according to claim 1, including the steps of computing a new output for each product of the ranks based on the number of blanks to be introduced obtained by subtracting one from the first number of blanks to be introduced until none of the outputs of the product ranks exceeds their respective maximum production values, and comparing the new output of each of the product ranks to its respective maximum production value, when it has been judged that the output of any one of the product ranks exceeds its respective maximum production value; and including the step of fixing the number of blanks to be introduced established at that time as the second number of blanks to be introduced, when it has been judged that none of the outputs of the product ranks exceeds their respective maximum production values.

4. An apparatus for indicating the number of blanks to be introduced comprising:

a number ordered input section for inputting the number of products ordered for each of a plurality of product ranks;

a maximum production value input section for inputting the maximum production value according to each of the product ranks;

an output ratio input section for inputting the output ratio according to each of the product ranks;

first blank introducing number computing means for computing the first number of blanks to be introduced based on the number of products ordered, which has been input from said number ordered input section, and the output ratios input from said output ratio input section, which first number is sufficient to satisfy the amount of orders made for any of the product ranks;

output computing means for computing the output of each of the product ranks when blanks are introduced in an amount equal to the first number of blanks to be introduced;

comparing means for comparing the output of each of the product ranks to its respective maximum production value, input from said maximum production value input section;

second blank introducing number computing means for computing the second number of blanks to be introduced when said comparing means has judged that that the output of any one of the product ranks exceeds its respective maximum production value, so that none of the outputs of the product ranks exceeds their respective maximum production values;

introducing number output means for outputting a final number of blanks to be introduced; and control means which transmits to said introducing number output section the first number of blanks to be introduced as a final number of blanks to be introduced when said comparing means has judged that none of the outputs of the product ranks exceeds their respective maximum production values, and which transmits to said introducing number output section the second number of blanks to be introduced as the final number of blanks to be introduced when said comparing means has judged that the output of any one of the product ranks exceeds its respective maximum production value.

5. An apparatus according to claim 4, wherein the second blank introducing number computing means comprises:

introducing number limit computing means for computing a limit regarding the number of blanks to be introduced so that the output of each of the product ranks does not exceed its respective maximum production value; and subtracting means for computing the second number of blanks to be introduced by subtracting this limit value from the first number to be introduced.

6. An apparatus according to claim 4, in which the second blank introducing number computing means subtracts one from the first number to be introduced and sends this new introducing number to said output computing means for computing the output once again.

7. A manufacturing system comprising:

a number ordered input section for inputting the number of products ordered for each of a plurality of product ranks;

a maximum production value input section for inputting the maximum production values of each of the product ranks;

an output ratio input section for inputting the output ratios of each of the product ranks;

first blank introducing number computing means for computing the first number of blanks to be introduced based on the number of products ordered input from said number ordered input section and the outputs input from said output ratio input section, which first quantity is sufficient to satisfy the amount of orders made for each of the product ranks;

output computing means for computing the output of each of the product ranks when an amount of blanks equal in number to the first number of blanks to be introduced has been introduced;

comparing means comparing the output of each of the product ranks to its respective maximum production value, input from said maximum production value input section;

second blank introducing number means for computing the second number of blanks to be introduced when said comparing means has judged that the output of any one of the product ranks exceeds its respective maximum production value, so that the output of each of the product ranks do not exceed its respective maximum production value;

a manufacturing apparatus for manufacturing products by processing the indicated number of blanks to be introduced; and control means which indicates the first number of blanks to be introduced as a final number of blanks to be introduced to said manufacturing apparatus when said comparing means has judged that the output of each of the product ranks do not exceed its respective maximum production value, and which indicates the second number of blanks to be introduced as the final number of blanks to be introduced to said manufacturing apparatus when said comparing means has judged that the output ratio of any one of the product ranks exceeds its respective maximum production value.

8. A system according claim 7, wherein the second blank introducing number computing means comprises:

introducing number limit computing means for computing a limit regarding the number of blanks to be introduced, so that the output of each of the product ranks do not exceed its respective maximum production value; and subtracting means which subtracts this limit value from the first number of blanks to be introduced for computing the second number of blanks to be introduced.

9. A system according to claim 7 in which the second blank introducing number computing means subtracts one from the first number of blanks to be introduced, and sends this resulting value to said output computing means for computing the output once again.

* * * * *